United States Patent
Kuzuya

(10) Patent No.: US 11,466,790 B2
(45) Date of Patent: Oct. 11, 2022

(54) ELECTRICALLY OPERATED GAS FLOW REGULATING VALVE

(71) Applicant: RINNAI CORPORATION, Aichi (JP)

(72) Inventor: Kotaro Kuzuya, Aichi (JP)

(73) Assignee: RINNAI CORPORATION, Aichi (JP)

( * ) Notice: Subject to any disclaimer, the term of this patent is extended or adjusted under 35 U.S.C. 154(b) by 0 days.

(21) Appl. No.: 17/360,255

(22) Filed: Jun. 28, 2021

(65) Prior Publication Data
US 2022/0042618 A1    Feb. 10, 2022

(30) Foreign Application Priority Data

Aug. 6, 2020    (JP) .............................. JP2020-133501

(51) Int. Cl.
| | |
|---|---|
| F16K 3/22 | (2006.01) |
| F16K 31/04 | (2006.01) |
| F16K 3/316 | (2006.01) |
| F16K 31/524 | (2006.01) |
| F16K 31/528 | (2006.01) |

(52) U.S. Cl.
CPC .............. *F16K 31/047* (2013.01); *F16K 3/22* (2013.01); *F16K 3/316* (2013.01); *F16K 31/5286* (2013.01); *F16K 31/52475* (2013.01)

(58) Field of Classification Search
CPC ............... F16K 3/316; F16K 31/52475; F16K 31/5286; F16K 31/047; F16K 3/22
See application file for complete search history.

(56) References Cited

U.S. PATENT DOCUMENTS

| | | | | |
|---|---|---|---|---|
| 6,007,047 | A * | 12/1999 | Phipps | F16K 31/528 74/25 |
| 6,923,247 | B1 * | 8/2005 | Ferber | B23K 26/389 165/47 |
| 7,871,059 | B2 * | 1/2011 | Nalini | F25B 41/35 251/129.11 |
| 9,657,656 | B2 * | 5/2017 | Weldon | F02D 31/003 |
| 10,859,177 | B2 * | 12/2020 | Kuzuya | F16K 1/38 |
| 2020/0232574 | A1 * | 7/2020 | Kuzuya | F16K 1/38 |

FOREIGN PATENT DOCUMENTS

JP    2018-013274 A    1/2018

* cited by examiner

*Primary Examiner* — Kevin R Barss
(74) *Attorney, Agent, or Firm* — Cermak Nakajima & McGowan LLP; Tomoko Nakajima

(57) ABSTRACT

An electrically operated gas flow regulating valve in which a needle valve body (2) is moved axially through a motion conversion mechanism (4) by the rotation of an electric motor (3). The motion conversion mechanism (4) includes: a guide tube (5) in which is formed axially elongated slits (51) with which cam pins (21) fixed to the needle valve (2) are slidably engaged; and a tubular cam body (6) having a spiral cam part with which the cam pins (21) are engages through elongated slits (51). In an arrangement in which one of the guide tube (5) and the cam body (6), e.g., the guide tube (5), is rotated by the electric motor (3), hysteresis is restrained from occurring.
The cam part disposed in the cam body (6) is constituted by a spirally inclined sides (61) with which the cam pins (21) are brought into contact from axial one direction. A spring member (7) is disposed so as to urge the cam pins (21) in the other of the axial directions toward the spirally inclined sides (61).

3 Claims, 3 Drawing Sheets

ELECTRICALLY OPERATED GAS FLOW REGULATING VALVE

TECHNICAL FIELD

The present invention relates to an electrically operated gas flow regulating valve comprising: a needle valve body moveable axially toward, or away from, a valve seat inside a valve casing; an electric motor; and a motion conversion mechanism for causing the needle valve body to move axially by rotation of the electric motor.

BACKGROUND ART

As this kind of electrically operated gas flow regulating valve, there is known one in which the motion conversion mechanism has: cam pins fixed to a needle valve body; a guide tube having formed therein axially elongated slits so as to be slidably engaged with the cam pins; and a tubular cam body having spiral grooves which serve as a cam part with which the cam pins are engaged through the axially elongated slits. The cam body is rotated by the rotation of the electric motor and the guide tube is prevented from rotating relative to the valve casing (see, e.g., patent document 1). In this related art, suppose: that a direction in which, out of axial directions, the needle valve body moves toward the valve seat is defined as a forward direction; that a direction in which the needle valve body moves away from the valve seat is defined as a backward direction; that a direction of rotation of the electric motor to move the needle valve body in the forward direction is defined as a normal rotating direction; and that the direction of rotation of the electric motor to move the needle valve body in the backward direction is defined as a reverse rotating direction. In this arrangement, by the rotation in the normal rotating direction of the cam body accompanied by the rotation of the electric motor in the normal rotating direction, backward-side side edge of the spiral grooves is brought into contact with the cam pins. By a forward-direction component of this contact force, the needle valve body is moved in the forward direction. By the rotation in the reverse rotating direction of the cam body accompanied by the rotation of the electric motor in the reverse rotating direction, the forward-side side edge of the spiral grooves is brought into contact with the cam pins. By a backward-direction component of this contact force, the needle valve body is moved in the backward direction.

In the above-mentioned first related art example, the cam body is rotated by the rotation of the electric motor and the guide tube is prevented from rotating relative to the valve casing. Alternatively, the guide tube may be rotated by the rotation of the electric motor so that the cam body can be prevented from rotating relative to the valve casing. In this second related art example, the electric motor is rotated in the normal rotating direction or in the reverse rotating direction, and accordingly the needle valve body is rotated in the normal rotating direction or in the reverse rotating direction through the guide tube and the cam pins. Also, by the forward-direction component of the contact reaction force of the cam pins relative to the backward-side side edge of the spiral grooves due to the forward-direction rotation of the needle valve body, the needle valve body is moved in the forward direction. The needle valve body is moved in the backward direction by the backward-direction component of the contact reaction force of the cam pins relative to the forward-side side edge of the spiral grooves due to the reverse-direction rotation of the needle valve body.

By the way, in either of the above-mentioned first and the second related art examples, in order for the cam pins to get smoothly inserted into the spiral grooves, and also in order not to cause prying (or sticking) of the cam pins to the spiral grooves, it is required that the distance between the forward-direction side edge and the backward-direction side edge of the spiral grooves be made slightly larger than the diameter of the cam pins. That is the reason why there will occur a phenomenon in which the gas flow volume differs, i.e., hysteresis occurs, even though the rotary phases of the electric motor are the same. In other words, the hysteresis occurs between: the time when the backward-direction side edge of the spiral grooves and the cam pins are brought into contact with each other by the rotation in the normal rotating direction of the electric motor so as to move the needle valve body in the forward direction; and the time when the forward-direction side edge of the spiral grooves and the cam pins are brought into contact with each other by the rotation in the reverse rotating direction of the electric motor so as to move the needle valve body in the reverse direction.

PRIOR ART DOCUMENT

Patent Document

[Patent Document 1] JP-A-2018-13274

SUMMARY

Problems that the Invention is to Solve

In view of the above points, this invention has a problem of providing an electrically operated gas flow regulating valve which is arranged to be capable of restraining the occurrence of hysteresis.

Means for Solving the Problems

In order to solve the above problem, this invention is an electrically operated gas flow regulating valve comprising: a needle valve body moveable axially toward, or away from, a valve seat inside a valve casing; an electric motor; and a motion conversion mechanism for causing the needle valve body to move axially by rotation of the electric motor. The motion conversion mechanism has: a cam pin fixed to the needle valve body; a guide tube having formed therein an axially elongated slit so as to be slidably engaged with the cam pin; and a tubular cam body having a spiral cam part with which the cam pin engages through the slit so that one of the guide tube and the cam body is rotated by the rotation of the electric motor and that the other thereof is prevented from rotating relative to the valve casing. Provided: that a direction in which, out of axial directions, the needle valve body moves toward the valve seat is defined as a forward direction; that a direction in which the needle valve body moves away from the valve seat is defined as a backward direction; that a direction of rotation of the electric motor to move the needle valve body in the forward direction is defined as a normal rotating direction; and that the direction of rotation of the electric motor to move the needle valve body in the backward direction is defined as a reverse rotating direction; the motion conversion mechanism is so arranged that, as a result of rotation of the electric motor in the normal rotating direction or in the reverse rotating direction, the needle valve body is moved in the forward direction or in the backward direction through the cam part and the cam pin by relative rotation of the cam pin with respect to the cam body. In the electrically operated gas flow regulating valve, the cam part is constituted by: a spirally inclined side with which the cam pin is capable of coming into contact from the forward direction or from the backward direction; and a spring member for urging the cam pin in the forward direction or in the backward direction toward the spirally inclined side.

According to this invention, when the electric motor is rotated in one of the normal rotating direction and the reverse rotating direction, the cam pin is urged by the spirally inclined side. Guided by the spirally inclined side, the cam pin will be pushed, against the urging force of the spring member, toward one of the forward direction and the backward direction. In addition, when the electric motor is rotated in the other of the normal rotating direction and the reverse rotating direction, the cam pin will contact the spirally inclined side by the urging force of the spring member. Guided by the spirally inclined side, the cam pin will be moved toward the other of the forward direction and the backward direction. Therefore, in either of the case in which the needle valve body is moved in the forward direction by the rotation in the normal rotating direction of the electric motor, and the case in which the needle valve body is moved in the backward direction by the rotation in the reverse rotating direction of the electric motor, the cam pin will come to be guided by the same spirally inclined side. As a result, as long as the rotary phase of the electric motor is the same with each other, the axial position of the needle valve body will become the same with each other. In this manner, the occurrence of hysteresis can be restrained.

In addition, in this invention, preferably the guide tube is arranged to be rotatable by the rotation of the electric motor; the guide tube is provided with a first spring shoe; and the spring member is interposed between the first spring shoe and a second spring shoe which is disposed in the needle valve body. According to this arrangement, the first spring shoe and the second spring shoe will both be rotated. As a result, unlike the case in which only one of the first spring shoe and the second spring shoe rotates, the spring member can be prevented from getting twisted (or kinked). Further, as described hereinafter, the gas will not flow into the place of disposing the spring member and, thus, can prevent the pressure loss from increasing by the spring member.

Further, in case the guide tube is arranged to be rotatable by the rotation of the electric motor so that the first spring shoe is disposed in the guide tube, preferably the cam pin is arranged to come into contact with the spirally inclined side from the backward direction, and the first spring shoe is disposed at an end portion in the backward direction of the guide tube. According to this arrangement, at the time of assembling, only by inserting into the guide tube from an end portion in the forward direction of the guide tube, the spring member and such a portion of the needle valve body as is provided with the cam pin and the second spring shoe, in sequence with each other, the spring member can be interposed between the first spring shoe and the second spring shoe. The ease of assembly work can be improved.

PREFERRED EMBODIMENTS FOR CARRYING OUT THE INVENTION

Figure 1:
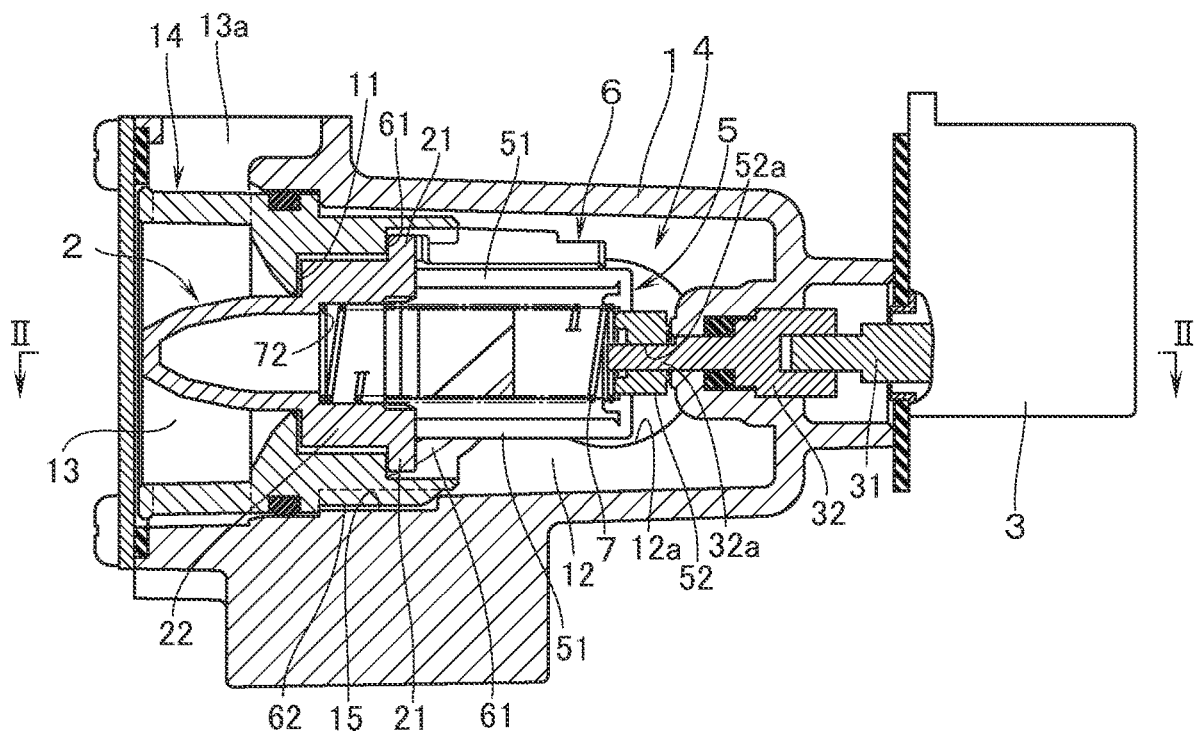
FIG. 1 is a sectional side view of an electrically operated gas flow regulating valve according to an embodiment of this invention.
Figure 2:
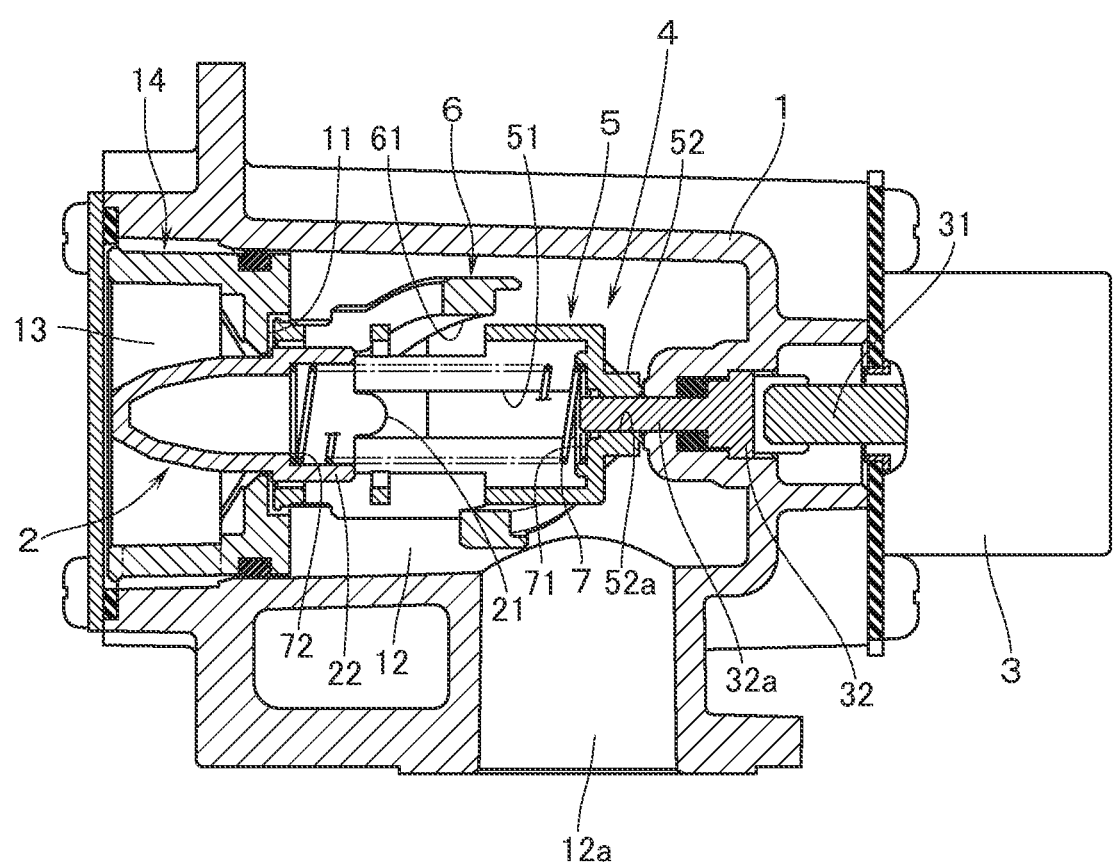
FIG. 2 is a sectional view of the electrically operated gas flow regulating valve sectioned along line II-II in FIG. 1.

With reference to FIGS. 1 and 2, an electrically operated gas flow regulating valve according to an embodiment of this invention has: a truncated-conical needle valve body 2 moveable axially toward, or away from, a valve seat 11 inside a valve casing 1; an electric motor 3; and a motion conversion mechanism 4 for causing the needle valve body 2 to move axially by the rotation of the electric motor 3. Inside the valve casing 1, there are provided a primary-side gas chamber 12 in communication with a gas inlet port 12a, and a secondary-side gas chamber 13 in communication with a gas outlet port 13a. In this arrangement, the secondary-side gas chamber 13 has mounted a member 14 having formed therein the valve seat 11 for partitioning the primary-side gas chamber 12 from the secondary-side gas chamber 13.

Description will hereinafter be made provided: that a direction in which, out of the axial directions, the needle valve body 2 moves toward the valve seat 11 is defined as a forward direction; that the direction in which the needle valve body 2 moves away from the valve seat 11 is defined as a backward direction; that a direction of rotation of the electric motor 3 to cause the needle valve body 2 to move in the forward direction is defined as a normal rotating direction; and that the direction of rotation of the electric motor 3 to cause the needle valve body 2 to move in the backward direction is defined as a reverse rotating direction.

Figure 3:
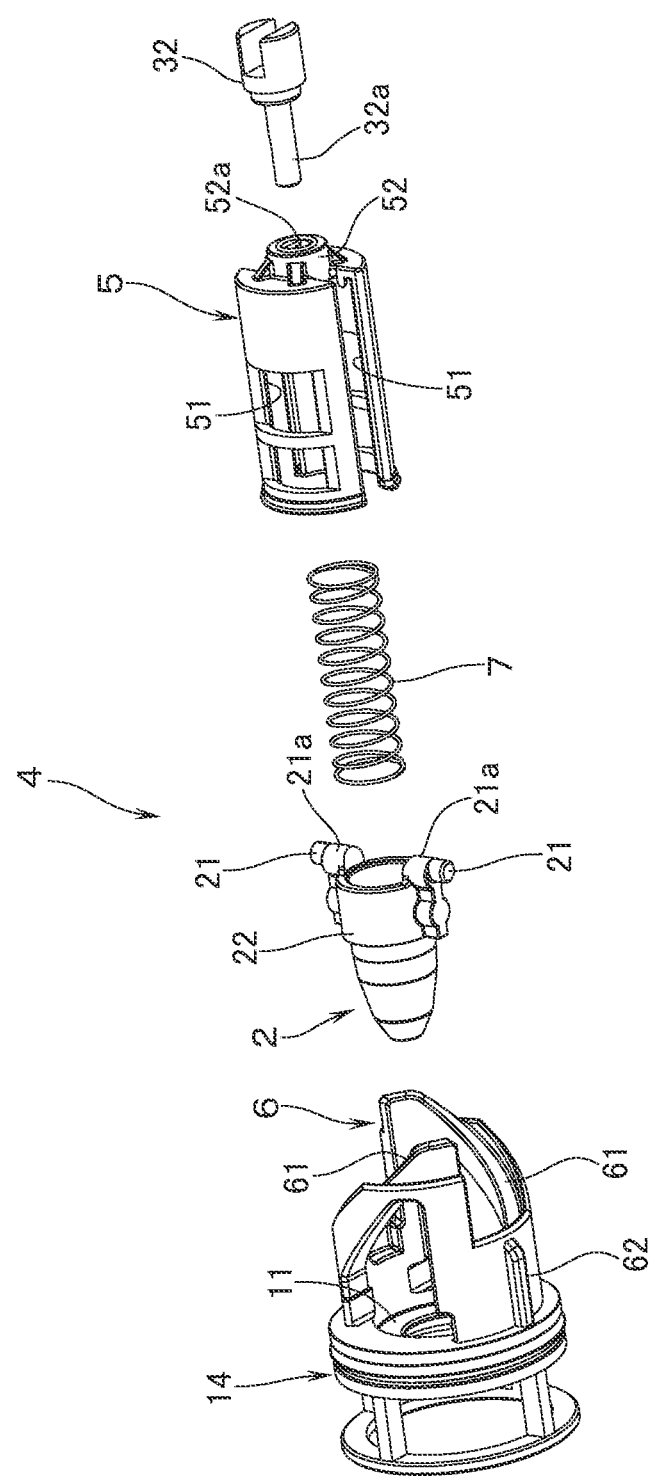
FIG. 3 is a perspective view in an exploded state of a motion conversion mechanism disposed in the electrically operated gas flow regulating valve of the embodiment.

With reference also to FIG. 3, the motion conversion mechanism 4 is provided with: cam pins 21 fixed to the needle valve body 2; a guide tube 5 having formed therein slits 51 elongated in the axial direction, the slits 51 being engageable with the cam pins 21 in a slidable manner; and a tubular cam body 6 having a spiral cam part with which the cam pins 21 get engaged through the slits 51. The electric motor 3 is disposed on an outside surface of an end portion in the backward direction of the valve casing 1. It is thus so arranged that, as a result of rotation of the electric motor 3, the guide tube 5 is rotated. In concrete, a boss part 52 disposed in a protruded manner at an end portion in the backward direction of the guide tube 5 has formed therein a coupling hole 52a of non-circular shape in cross section. Also an axis part 32a, non-circular in cross section, of a connector 32 to be connected to an output shaft 31 of the electric motor 3, is fitted into the coupling hole 52a. According to this arrangement, the guide tube 5 is connected, through the connector 32, to the output shaft 31 of the electric motor 3, so that the guide tube 5 can be rotated by the rotation of the electric motor 3.

The needle valve body 2 has a tubular part 22 which is elongated in the backward direction so as to be inserted into the guide tube 5. On an end portion in the backward direction of this tubular part 22 there are disposed the cam pins 21 in a manner to protrude radially outward. In addition, the base portions of the cam pins 21 have formed therein large-diameter portions 21a. These large-diameter portions 21a are slidably engaged with the slits 51 formed in the guide tube 5. As a result, the needle valve body 2 is arranged to be coupled to the guide tube 5 in a manner to be axially movable relative to the guide tube 5 and also to be rotatable therewith.

The cam body 6 is prevented from rotating relative to the valve casing 1. In concrete, a rib 62 formed in a protruded manner on an external surface of the cam body 6 is engaged with a groove 15 formed on an inner surface of the valve casing 1, thereby preventing the cam body 6 from rotating relative to the casing 1. In addition, in order to reduce the number of constituent parts, the cam body 6 is formed integral with a member 14 in which the valve seat 11 is formed.

The cam part disposed in the cam body 6 is capable of coming into contact with the cam pins 21 from the backward direction, and is constituted by spirally inclined sides 61 with an inclination in the normal rotating direction toward the forward direction. In addition, there is disposed a spring member 7 which urges the cam pins 21 in the forward direction toward the spirally inclined sides 61. More specifically, there are provided a first spring shoe 71 on an end portion in the backward direction of the guide tube 5, and a second spring shoe 72 constituted by a stepped surface looking toward the backward direction which is formed at an inner surface in the base portion of the tubular part 22 of the needle valve body 2. Between the first spring shoe 71 and the second spring shoe 72 there is interposed the spring member 7 made up of a coil spring.

According to the above-mentioned arrangement, when the electric motor 3 is rotated in the reverse rotating direction, the cam pins 21 will be urged by the spirally inclined sides 61 and, guided by the spirally inclined sides 61, will be urged in the backward direction against the urging force of the spring member 7. Further, when the electric motor 3 is rotated in the normal rotating direction, the cam pins 21 will come into contact with the spirally inclined sides 61 by the urging force of the spring member 7, and is moved in the forward direction guided by the spirally inclined sides 61. Therefore, in any of the case in which the needle valve body 2 is moved in the forward direction by rotating the electric motor 3 in the normal rotating direction and the case in which the needle valve body 2 is moved in the backward direction in the reverse rotating direction by rotating the electric motor 3, the cam pins 21 will come to be guided by the same spirally inclined sides 61. As a result, as long as the rotary phases of the electric motor 3 are the same, the axial position of the needle valve body 2 will be the same, thereby restraining the occurrence of hysteresis.

Alternatively, it is also possible to provide the valve casing 1 with the first spring shoe 71, and to interpose the spring member 7 between this first spring shoe 71 and the second spring shoe 72 that is disposed in the needle valve body 2. In this arrangement, however, only the second spring shoe 72 will be rotated as a result of the rotation of the electric motor 3, thereby resulting in the occurrence of twisting of the spring member 7. On the other hand, if the guide tube 5 is provided with the first spring shoe 71 as in this embodiment, as a result of the rotation of the electric motor 3, both the second spring shoe 72 and the first spring shoe 71 will come to be rotated together. Therefore, there will occur no twisting (or kinking) of the spring member 7.

Alternatively, it is also possible to dispose the cam body 6 in a portion closer, in the backward direction, to the inside of the valve casing 1, and then to provide this cam body 6 with spirally inclined sides 61 with which the cam pins 21 are able to come into contact from the forward direction. In this case, the following arrangement is conceivable. Namely, the first spring shoe 71 is disposed at an end portion, to the side of the forward direction of the guide tube 5; and also the needle valve body 2 is provided with a second valve receiving shoe 72 at a position to the side closer in the backward direction than the first spring shoe 71; and by the spring member 7 that is interposed between the first spring shoe 71 and the second spring shoe 72, the cam pins 21 are urged in the backward direction toward the spirally inclined sides 61. In this arrangement, however, at the time of assembling, the following procedure becomes necessary. Namely, after having inserted such a portion of the valve body 2 as is provided with the cam pins 21 and the second spring shoe 72 into the guide tube 5 from the end portion on the side of the forward direction, the first spring shoe 71 that is separate from the guide tube 5 must be mounted to the end portion on the side of the forward direction of the guide tube 5. This brings about a troublesome assembling job.

Therefore, in order to improve the ease in assembling job, preferably the following arrangement shall be employed as in this embodiment. Namely, the cam pins 21 are arranged to come into contact with the spirally inclined sides 61 from the backward direction, and the end portion in the backward direction of the guide tube 5 is provided with the first spring shoe 71. According to this arrangement, at the time of assembling, only by inserting in sequence from the end portion in the forward direction into the guide tube 5, the spring member 7 and such a portion of the needle valve 2 as is provided with the cam pins 21 and the second spring shoe 72, i.e., the tubular part 22, the spring member 7 can be interposed between the first spring shoe 71 and the second spring shoe 72. The assembly work thus becomes easy.

Descriptions have so far been made of the embodiments of this invention with reference to the drawings. But this invention shall not be limited to the above. For example, in the above-mentioned embodiments, an arrangement is made that the guide tube 5 is rotated by the rotation of the electric motor 3, and that the cam body 6 is restrained from rotating relative to the valve casing 1. It is, however, possible to dispose the cam body 6 in such a portion inside the valve casing 1 as is closer in the backward direction so that the cam body 6 is rotated by the rotation of the electric motor 3, and the guide tube 5 is restrained from rotating relative to the valve casing 1. In this case, the following arrangement is conceivable. Namely, the cam body 6 is provided with spirally inclined sides 61 which are capable of coming into contact with the cam pins 21 from the forward direction. While causing the valve seat 11 to serve as the first spring shoe, the spring member 7 interposed between the valve seat 11 and the second spring shoe which is disposed in the needle valve body 2 is used to urge the cam pins 21 in the backward direction toward the spirally inclined sides 61. This arrangement, however, will be that the gas will flow through the portion in which the spring member 7 is disposed and the pressure loss will increase due to the spring member 7. On the other hand, as in this embodiment, the guide tube 5 is arranged to be rotated by the rotation of the electric motor 3, and the guide tube 5 is provided with the first spring shoe 71. Then, the gas will not flow through the portion in which the spring member 7 is disposed. The increase in the pressure loss due to the spring member 7 can advantageously be prevented.

EXPLANATION OF MARKS 1 valve casing
11 valve seat
2 needle valve body
21 cam pin
3 electric motor
4 motion conversion mechanism
5 guide tube 51 slit
6 cam body
61 spirally inclined side
7 spring member
71 first spring shoe
72 second spring shoe

The invention claimed is:

1. An electrically operated gas flow regulating valve comprising: a needle valve body moveable axially toward, or away from, a valve seat inside a valve casing; an electric motor; and a motion conversion mechanism for causing the needle valve body to move axially by rotation of the electric motor, the motion conversion mechanism having: a cam pin fixed to the needle valve body; a guide tube having formed therein an axially elongated slit so as to be slidably engaged with the cam pin; and a tubular cam body having a spiral cam part with which the cam pin engages through the slit so that one of the guide tube and the cam body is rotated by the rotation of the electric motor and that the other thereof is prevented from rotating relative to the valve casing, provided: that a direction in which, out of axial directions, the needle valve body moves toward the valve seat is defined as a forward direction; that a direction in which the needle valve body moves away from the valve seat is defined as a backward direction; that a direction of rotation of the electric motor to move the needle valve body in the forward direction is defined as a normal rotating direction; and that the direction of rotation of the electric motor to move the needle valve body in the backward direction is defined as a reverse rotating direction; the motion conversion mechanism being so arranged that, as a result of rotation of the electric motor in the normal rotating direction or in the reverse rotating direction, the needle valve body is moved in the forward direction or in the backward direction through the cam part and the cam pin by relative rotation of the cam pin with respect to the cam body;

wherein the cam part is constituted by: a spirally inclined side with which the cam pin is capable of coming into contact from the forward direction or from the backward direction; and a spring member for urging the cam pin in the forward direction or in the backward direction toward the spirally inclined side.

2. The electrically operated gas flow regulating valve according to claim 1, wherein: the guide tube is arranged to be rotatable by the rotation of the electric motor; the guide tube is provided with a first spring shoe; and the spring member is interposed between the first spring shoe and a second spring shoe which is disposed in the needle valve body.

3. The electrically operated gas flow regulating valve according to claim 2, wherein the cam pin is arranged to come into contact with the spirally inclined side from the backward direction, and wherein the first spring shoe is disposed at an end portion in the backward direction of the guide tube.

* * * * *